United States Patent Office
3,542,800
Patented Nov. 24, 1970

3,542,800
DITHIOPHOSPHORIC ESTERS
Heiner Dickhaeuser, Ludwigshafen (Rhine), Gustav Steinbrunn, Schwegenheim, Pfalz, Heinrich Adolphi, Limburgerhof, Pfalz, and Guenter Scheuerer, Ludwigshafen (Rhine), Germany, assignors to Badische Anilin-& Soda-Fabrik Aktiengesellschaft, Ludwigshafen (Rhine), Germany
No Drawing. Filed July 10, 1967, Ser. No. 652,035
Claims priority, application Germany, July 14, 1966, 1,542,833
Int. Cl. A01n 9/36; C07f 9/18
U.S. Cl. 260—948                3 Claims

ABSTRACT OF THE DISCLOSURE

Dithiophosphoric esters and their use for controlling insects and spider mites, said esters having the formula

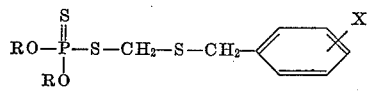

in which R denotes a methyl group or ethyl group; X denotes a bromine atom or a fluorine atom and $n$ denotes one of the integers 1 and 2; or X denotes a chlorine atom and $n$ denotes one of the integers 2 or 3.

---

The present invention relates to dithiophosphoric esters, particularly dithiophosphoric esters bearing a halophenyl radical as a substituent, and a method of controlling insects or spider mites with these compounds.

U.S. patent specification No. 3,171,853 describes a process for the production of compounds having the formula $$\begin{array}{c} X \\ \| \\ R^1\!-\!P\!-\!S\!-\!CH_2\!-\!S\!-\!CH_2\!-\!\phi \\ | \\ R^2 \end{array}$$

in which X denotes an oxygen atom or a sulphur atom, $R^1$ and $R^2$ denote, inter alia, any alkoxy radical and the phenyl radical may bear substituents. The products may be used for pest control in plant protection.

An object of the present invention is to provide new dithiophosphoric esters which have a good insecticidal and acaricidal action. Another object of the invention is to provide a process for controlling insects or spider mites with dithiophosphoric esters.

These and other objects of the invention are achieved with compounds having the formula:

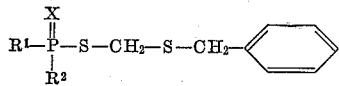

in which R denotes a methyl group or ethyl group; X denotes a bromine atom or a fluorine atom and $n$ denotes one of the integers 1 and 2; or X denotes a chlorine atom and $n$ denotes one of the integers 2 or 3, which have a strong effect on insects and their larvae and also on mites, and moreover, have outstanding stability in aqueous media. In these respects they are far superior to the prior art benzyl derivatives or o-chlorobenzyl derivatives.

The compounds to be used according to this invention may be prepared by conventional methods, for example:

(a) by reaction of O,O-dialykl-S-chloromethyl-dithiophosphoric esters with the appropriate substituted benzylmercaptans or their salts, or (b) by reaction of O,O-dialkyldithiophosphoric acids with formaldehyde and the appropriate substituted benzylmercaptans, or (c) by reaction of O,O-dialkyldithiophosphoric salts with the appropriate substituted chloromethylbenzyl sulfides which in turn are easily accessible from the corresponding benzylmercaptans, formaldehyde and hydrogen chloride.

Examples of suitable substituted benzylmercaptans are:

2,4-dichlorobenzylmercaptan,
2,5-dichlorobenzylmercaptan,
2,6-dichlorobenzylmercaptan,
3,4-dichlorobenzylmercaptan,
3,5-dichlorobenzylmercaptan,
2,3,4-trichlorobenzylmercaptan,
2,3,6-trichlorobenzylmercaptan,
2,4,5-trichlorobenzylmercaptan,
2,4,6-trichlorobenzylmercaptan,
2-bromobenzylmercaptan,
3-bromobenzylmercaptan,
4-bromobenzylmercaptan,
2,5-dibromobenzylmercaptan,
3,5-dibromobenzylmercaptan,
2-flurorobenzylmercaptan,
3-fluorobenzylmercaptan and
4-fluorobenzylmercaptan.

The following description illustrates the production of the new compounds.

24.2 parts (by weight) of chloromethyl-(2,6-dichlorobenzyl) sulfide is added to a solution of 19.8 parts of sodium O,O-dimethyldithiophosphate in 50 parts of acetone and when the slightly exothermic reaction has died down the whole is boiled for another three hours under reflux. The whole is then allowed to cool and the deposited common salt is separated from the solution and the bulk of the acetone is distilled off from the filtrate. The residue is taken up in 100 parts of chloroform, washed with water and dried over sodium sulfate. The solvent is removed in vacuo and 30.3 parts of a pale yellowish oil remains; $n_D^{25}=1.606$. The substance has the formula:

(No. 1)

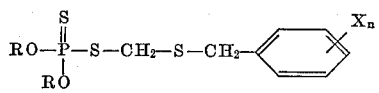

The following compounds may be obtained analogously or by one of the other two methods of preparation given above:

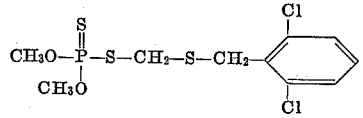

| | R | $-CH_2-\phi X_n$ | $n_D^{25}$ |
|---|---|---|---|
| Number: | | | |
| 2 | ethyl | 2,6-dichlorobenzyl | 1.592 |
| 3 | methyl | 2,5-dichlorobenzyl | 1.603 |
| 4 | ethyl | 2,5-dichlorobenzyl | 1.589 |
| 5 | methyl | 2,4-dichlorobenzyl | 1.604 |
| 6 | ethyl | 2,4-dichlorobenzyl | 1.588 |
| 7 | methyl | 3,4-dichlorobenzyl | 1.609 |
| 8 | ethyl | 3,4-dichlorobenzyl | 1.591 |
| 9 | methyl | 2,3,6-trichlorobenzyl | 1.612 |
| 10 | ethyl | 2,3,6-trichlorobenzyl | 1.603 |
| 11 | methyl | 2,4,6-trichlorobenzyl | 1.619 |
| 12 | ethyl | 2,4,6-trichlorobenzyl | 1.598 |
| 13 | methyl | 2,3,4-trichlorobenzyl | 1.622 |
| 14 | ethyl | 2,3,4-trichlorobenzyl | 1.601 |
| 15 | methyl | 2-bromobenzyl | 1.611 |
| 16 | methyl | 4-bromobenzyl | 1.614 |
| 17 | methyl | 2-fluorobenzyl | 1.579 |
| 18 | ethyl | 2-fluorobenzyl | 1.564 |

The active ingredient, which is usually obtained as an oil, may be processed in the conventional manner by adding extenders, solvents, emulsifiers or other assistants to form suspensions, solutions, emulsifiable concentrates, granulates or dusts, and may be used in these forms. They may also be mixed with other plant protection agents, for example insecticides.

The following examples illustrate the use of the agents according to this invention and show their superiority over the substance described in U.S. patent specification No. 3,171,853 and over other monochlorosubstituted or dimethylsubstituted benzyl derivatives.

Substances used for purposes of comparison are as follows:

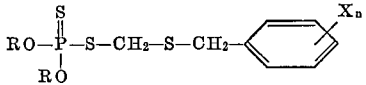

| R | $-CH_2-\langle X_n \rangle$ | Remarks |
|---|---|---|
| Designation: | | |
| A ............ ethyl | benzyl | Example 1.[1] |
| B ............ methyl | 2-chlorobenzyl | Example 4.[1] |
| C ............ ethyl | 2-chlorobenzyl | Example 5.[1] |
| D ............ methyl | 4-chlorobenzyl | |
| E ............ ethyl | 4-chlorobenzyl | |
| F ............ methyl | 3-chlorobenzyl | |
| G ............ ethyl | 3-chlorobenzyl | |
| H ............ ethyl | 2,3-dimethylbenzyl | |
| I ............ ethyl | 4-chlorophenyl | Trithion. |

[1] U.S. Pat. 3,171,853.

EXAMPLE 1

Test on mosquito larvae

Fourth-stage larvae of the yellow-fever mosquito (*Aedes aegypti* L.) are exposed to the action of the test substances in pure water. Twenty-four hours later the mortality rate is determined. Concentrations which kill more than 95% of the mosquito larvae in this period are considered effective.

| Active ingredient No.: | p.p.m. | Whether effective |
|---|---|---|
| 1 | 0.01 | Yes. |
| 15 | 0.01 | Yes. |
| 16 | 0.005 | Yes. |
| 17 | 0.01 | Yes. |
| A | 0.05 | Yes. |
|   | 0.01 | No. |
| D | 0.05 | Yes. |
|   | 0.01 | No. |
| E | 0.05 | Yes. |
|   | 0.01 | No. |
| G | 0.05 | Yes. |
|   | 0.01 | No. |
| H | 0.05 | Yes. |
|   | 0.01 | No. |

EXAMPLE 2

Test of the stability of aqueous emulsions

The active ingredients are prepared as 0.1% by weight aqueous emulsions and adjusted to pH values of 5, 7, and 9. They are then stored in glass vessels at 21° C. Samples are withdrawn at weekly intervals, diluted with water to 0.05 p.p.m. of active ingredient and their biological effectiveness tested with mosquito larvae (by the method of Example 1).

Active ingredient No.

1—fully effective for over six weeks
3—fully effective for over six weeks
4—fully effective for over six weeks
5—fully effective for over six weeks
7—fully effective for over six weeks
8—fully effective for up to six weeks
A—effective for up to three weeks
G—effective for up to three weeks In all the pH ranges tested.

EXAMPLE 3

Test on spider mites

Potted dwarf beans, which exhibit strong attack by two-spotted spider mites (*Tetranychus telarius*) and a copious deposit of eggs, are sprayed with an aqueous preparation of the active ingredient until they are dripping wet. Concentrations are regarded as effective which kill more than 95% of the mites and with which no viable fresh larvae have hatched from the eggs after twelve days.

| Active ingredient No.: | Effective concentration, percent |
|---|---|
| 2 | 0.001 |
| 4 | 0.001 |
| 6 | 0.001 |
| 8 | 0.002 |
| 10 | 0.0025 |
| A | 0.01 |
| D | 0.01 |
| F | 0.01 |
| H | 0.05 |

EXAMPLE 4

Effect of stomach poison on caterpillars

Cabbage leaves are dipped into an aqueous preparation of the active ingredient and allowed to dry; then caterpillars of the cabbage moth (*Plutella maculipennis*) are placed on the leaves. The effect is ascertained forty-eight hours later. The concentration of active ingredient in the preparation is given which causes a mortality rate of more than 95%.

|   | Concentration, percent | Whether effective |
|---|---|---|
| 1 | 0.005 | Yes. |
| 6 | 0.005 | Yes. |
| 11 | 0.005 | Yes. |
| 12 | 0.01 | Yes. |
| 13 | 0.01 | Yes. |
| 14 | 0.01 | Yes. |
| A | 0.02 | Yes. |
| A | 0.01 | Mortality less than 80%. |
| F | 0.02 | Yes. |
| F | 0.01 | Mortality less than 80%. |
| H | 0.1 | Mortality less than 50%. |

EXAMPLE 5

Effect of continuous contact on cockroaches

Adult cockroaches (*Blatta orientalis* L.) are placed on a filter with 500 mg. of talc powder containing the test substance and the effect is observed after forty-eight hours. This is given in the amount of active ingredient in mg. which will kill more than 80% of the cockroaches.

| Active ingredient No.: | Mg. |
|---|---|
| 1 | 0.25 |
| 16 | 0.25 |
| 17 | 0.125 |
| B | 1 |
| C | 1.25 |
| I | 1 |

EXAMPLE 6

10 g. of wheat flour containing a large deposit of eggs of the flour moth (*Ephestia kuehniella*) is intimately mixed with a talc preparation of the active ingredient and stored in glasses at 22° C. Four weeks later the development of the larvae is assessed; an amount of active ingredient is regarded as effective when neither larvae nor cocoons are present in the flour.

| Active ingredient No.: | Effective concentration, p.p.m. |
|---|---|
| 1 | 25 |
| 4 | 10 |
| 9 | 10 |
| 17 | 20 |

| | |
|---|---|
| 18 | 20 |
| A | 50 |
| B | 50 |
| D | 100 |
| E | 100 |
| F | 100 |
| G | 100 |

We claim:

1. A dithiophosphoric ester having the formula:

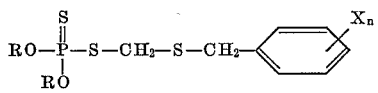

in which R denotes a methyl group or ethyl group, X denotes a bromine atom or fluorine atom and $n$ is 1 or 2.

2. An ester as in claim 1 wherein X is bromine and $n$ is one.

3. An ester as in claim 1 wherein X is fluorine and $n$ is one.

References Cited

UNITED STATES PATENTS 3,171,853  3/1965  Lorenz et al. _____ 260—948

CHARLES B. PARKER, Primary Examiner

A. H. SUTTAO, Assistant Examiner

U.S. Cl. X.R.

260—968, 978; 424—215